July 14, 1942.     E. O. GOERKE ET AL     2,289,703
METHOD OF MAKING BEARINGS
Filed Nov. 8, 1939
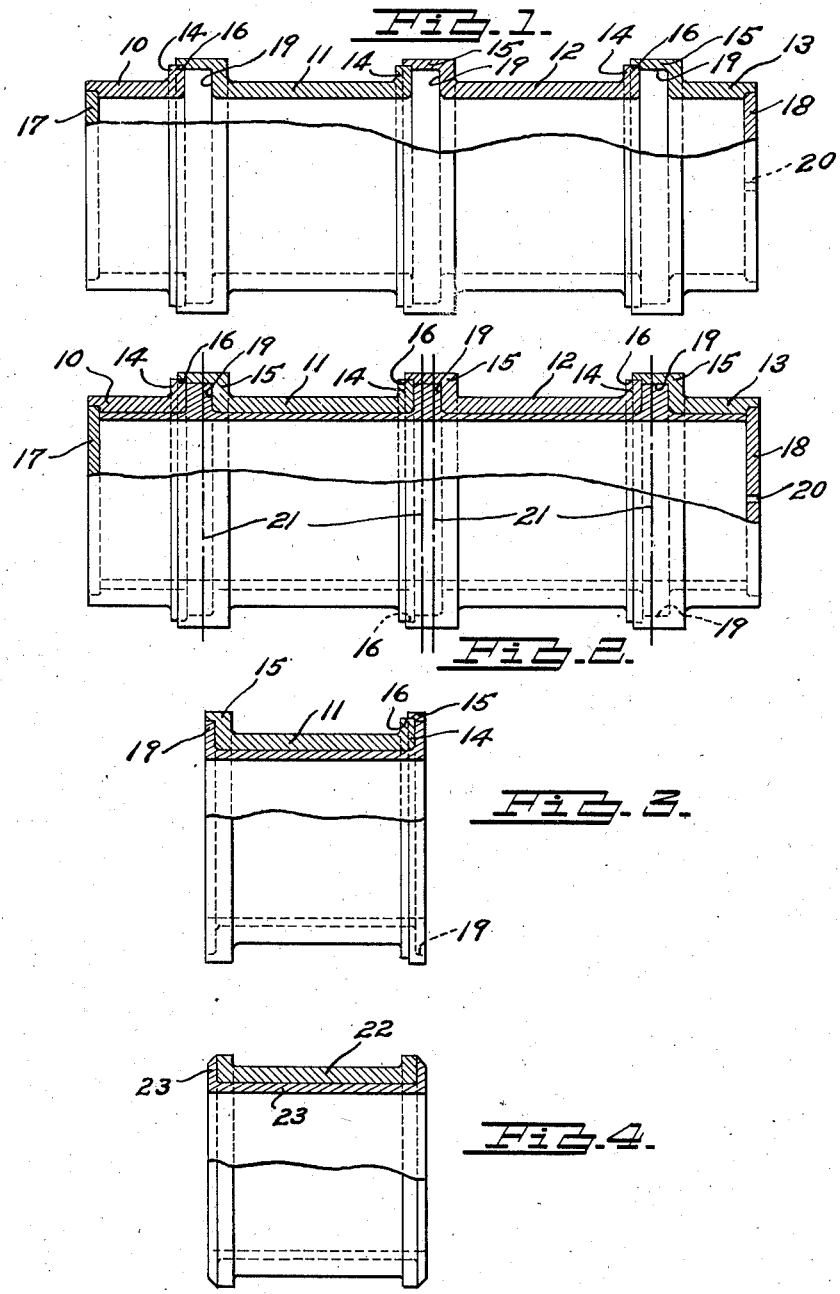
INVENTOR.
Edwin O. Goerke
Charles E. Eggenschwiler
BY Ramsey, Kent, Chisholm + Lutz
ATTORNEYS.

Patented July 14, 1942

2,289,703

UNITED STATES PATENT OFFICE 2,289,703

METHOD OF MAKING BEARINGS

Edwin O. Goerke, Dearborn, and Charles E. Eggenschwiler, Detroit, Mich., assignors to Bohn Aluminum & Brass Corporation, Detroit, Mich., a corporation of Michigan Application November 8, 1939, Serial No. 303,451

4 Claims. (Cl. 29—149.5)

This invention relates to a method of producing bearings, particularly that type of bearing in which the bearing metal is placed on the inside of a supporting sleeve of a stiffer material.

In carrying out the invention, a cylindrical shell of the stiff supporting metal, such as steel, is built up by fastening together a plurality of separate sections so formed that when assembled the shell has a plurality of grooves on its inner periphery. The bearing metal is then cast on the inner periphery of the shell, preferably by a spinning operation. After the bearing metal has become solidified the shell is sawed into sections, the saw cuts passing through the bearing metal in the grooves of the shell to produce bearing sections having flanges at both ends, the layer of bearing metal covering the outer faces of the flanges as well as the inner periphery of the section.

These and other objects and advantages of the invention will become apparent as the description proceeds.

While a preferred form of the invention is disclosed herein for purposes of illustration, it should be understood that various changes may be made in the method without departing from the spirit of the invention as herein set forth and claimed.

In the drawing:

Fig. 1 is an elevation, partly in section, of a shell as assembled in one step of the process.

Fig. 2 is a view similar to Fig. 1 but showing the parts after the bearing metal has been cast in the shell.

Fig. 3 is an elevation partly in section of a bearing section in the rough after being severed from the shell.

Fig. 4 is a view similar to Fig. 3 but showing the completed bearing.

The method of the invention starts with the assembly of a shell formed of several individual cylindrical pieces, 10, 11, 12 and 13, which are made of a suitable backing material, such as steel. Each of the pieces 11 and 12 has a flange 14 and a bell end 15, the bell being formed with a counterbore 16. The end piece 10 has a flange 14 at one end and is counterbored at the other end to receive a closure disc 17, while the other end piece 13 is similarly fitted with a disc 18 but has at its inner end a bell mouth 15.

Any desired number of the pieces 11 and 12 may be used in forming the closed shell, but in the example illustrated only two of these pieces are provided. In assembling the shell each of the flanges 14 is fitted into a counterbore 16, leaving an annular groove 19 on the inside of each bell end 15. The joints between the pieces 10, 11, 12 and 13 are welded up, and one of the discs, 17, is welded in place.

Prior to complete closing of the shell materials for forming the lining are introduced into it. These consist of the bearing metal, in this instance commercially pure silver, a suitable flux, and materials to produce a reducing atmosphere, for example a combination of lubricating oil and naphtha. After these materials have been loaded into the shell the closure disc 18, which has a blow hole 20, is welded in place.

The closed shell is heated to a temperature sufficient to melt the bearing metal and is then rotated rapidly in order to centrifugally cast the bearing metal on the interior wall of the shell. The flux helps to bond the silver to the steel, while the reducing atmosphere prevents oxidation of the silver. The rotation of the shell is continued while it is cooling to solidify the layer of bearing metal. As the result of this centrifugal casting the bearing metal forms an even, dense layer on the inner periphery of the shell and completely fills the grooves 19, as shown in Fig. 2.

The next step in forming the bearings is to cut the shell cross-axially on the saw lines 21 indicated in Fig. 2, thus forming the pieces 11 and 12 into two rough bearings as illustrated in Fig. 3. The end pieces 10 and 13 are not used for bearings and may be treated for recovery of the bearing metal.

The rough bearings of Fig. 3 are then subjected to machining operations to remove the outer rim of the bell 15 and to true up the surfaces, after which the bearing takes the form shown in Fig. 4, where the steel shell 22 has outturned end flanges, a continuous layer 23 of bearing metal covering the inner wall of the bearing and the outer surfaces of the end flanges.

The bearing illustrated is a single cylindrical piece, but if desired it may be cut into two semi-cylindrical sections according to practices known in the art.

It will be apparent that the method described above provides a convenient and economical way of forming bearings with flanges covered by the layer of bearing material.

We claim:

1. In a method of forming bearings by hot spinning a layer of bearing metal on the inner periphery of a shell of supporting metal, the improvement which comprises: assembling a plurality of steel tube sections having complementary members comprising bell ends and flanges; forming counterbores on some of the complementary members; forming a shell by welding the tube sections together with alternate complementary members interfitted with the counterbores to form interior grooves of larger diameter than the normal diameter of the tube sections; placing within the shell a charge consisting of bearing metal, flux, and material to produce a reducing atmosphere; covering the ends of the shell; spinning the tube while the bearing metal solidifies, thereby casting the bearing metal so as to form a level coating on the inner peripheral wall of the shell; severing the shell by saw cuts through said grooves to form rough bearings; removing excess material and finishing the rough bearings.

2. In a method of forming bearings by hot spinning a layer of bearing metal on the inner periphery of a shell of supporting metal, the improvement which comprises: assembling a plurality of steel tube sections having complementary members comprising bell ends and flanges; interfitting the flanges with the bell ends to form interior circular grooves of larger diameter than the normal inner diameter of the tube sections; welding the sections together to form a shell; placing within the shell a charge consisting of bearing metal, flux, and material to produce a reducing atmosphere; covering the ends of the shell; heating the shell to a temperature sufficient to melt the bearing metal; spinning the tube while the bearing metal solidifies, thereby casting the bearing metal so as to form a level coating on the inner peripheral wall of the shell; severing the shell by saw cuts passing through the middle parts of said grooves to form rough bearings; removing excess material from the rough bearings and finishing them to form flanged bearings with bearing metal extending over their inner circumferential walls and over the end flanges.

3. In a method of forming bearings by hot spinning a layer of bearing metal on the inner periphery of a shell of supporting metal, the improvement which comprises: assembling a plurality of steel tube sections having complementary members comprising bell ends and flanges; forming the bell ends with counterbores which receive the flanges but hold them spaced from the bottoms of the bell ends; interfitting the sections with the flanges resting in the counterbores to form interior circular grooves of larger diameter than the normal inner diameter of the tube sections; welding the sections together to form a shell; placing within the shell a charge consisting of bearing metal, flux, and material to produce a reducing atmosphere; covering the ends of the shell; heating the shell to a temperature sufficient to melt the bearing metal; spinning the tube while the bearing metal solidifies, thereby casting the bearing metal so as to form a level coating on the inner peripheral wall of the shell; severing the shell by saw cuts passing through the middle parts of said grooves to form rough bearings; removing excess material from the rough bearings and finishing them to form flanged bearings with bearing metal extending over their inner circumferential walls and over the end flanges.

4. In a method of forming bearings by hot spinning a layer of bearing metal on the inner periphery of a shell of supporting metal, the improvement which comprises: assembling a plurality of tube sections of the supporting metal having bell ends and flanges; interfitting the flanges with the bell ends to form interior circular grooves of larger diameter than the normal inner diameter of the tube sections; securing the tube sections together; casting the bearing metal so as to fill the enlarged interior grooves and form a coating on the inner peripheral wall of the shell, the inner surface of the coating forming a smooth cylindrical bore; severing the shell by saw cuts passing through the middle parts of said grooves to form rough bearings having at each end a flange faced by bearing metal; and finishing the rough bearings.

EDWIN O. GOERKE.
CHARLES E. EGGENSCHWILER.